US008015083B1

(12) United States Patent
Sterling et al.

(10) Patent No.: US 8,015,083 B1
(45) Date of Patent: Sep. 6, 2011

(54) METHOD AND APPARATUS FOR CLIENT-SPECIFIC NOTIFICATION SERVICE (75) Inventors: David N. Sterling, Carrollton, TX (US); Hiep Nguyen, Carrollton, TX (US); Laurie A. Irish-Duncan, Plano, TX (US); Albert S. Baines, Little Elm, TX (US); Kenneth R. Howard, Allen, TX (US); Pamela R. Welch, Carrollton, TX (US); William W. Huckabee, Sachse, TX (US)

(73) Assignee: Intuit Inc., Mountain View, CA (US)

( * ) Notice: Subject to any disclaimer, the term of this patent is extended or adjusted under 35 U.S.C. 154(b) by 648 days.

(21) Appl. No.: 11/518,706

(22) Filed: Sep. 11, 2006

(51) Int. Cl.
G06F 17/22 (2006.01)
G06Q 40/00 (2006.01)
(52) U.S. Cl. .......................... 705/31; 705/36 T; 705/19
(58) Field of Classification Search .................. 700/220; 705/1, 10, 19, 26, 33; 715/234
See application file for complete search history.

(56) References Cited

U.S. PATENT DOCUMENTS

| | | | |
|---|---|---|---|
| 5,911,136 A | 6/1999 | Atkins | |
| 6,202,052 B1 * | 3/2001 | Miller | 705/31 |
| 6,327,574 B1 | 12/2001 | Kramer et al. | |
| 6,829,519 B2 | 12/2004 | Liberty et al. | |
| 7,234,103 B1 * | 6/2007 | Regan | 715/234 |
| 7,403,942 B1 * | 7/2008 | Bayliss | 707/748 |
| 7,496,624 B2 * | 2/2009 | Falter et al. | 709/203 |
| 7,539,635 B1 * | 5/2009 | Peak et al. | 705/31 |
| 7,571,211 B1 * | 8/2009 | Melick et al. | 709/206 |
| 2002/0111888 A1 * | 8/2002 | Stanley et al. | 705/31 |
| 2004/0205533 A1 * | 10/2004 | Lopata et al. | 715/507 |
| 2005/0060234 A1 * | 3/2005 | Reahard | 705/19 |
| 2005/0076109 A1 | 4/2005 | Mathew et al. | |
| 2005/0144294 A1 * | 6/2005 | Gellens et al. | 709/228 |
| 2006/0026086 A1 * | 2/2006 | Jim | 705/35 |
| 2006/0085306 A1 * | 4/2006 | Schulte et al. | 705/31 |
| 2007/0005461 A1 * | 1/2007 | Lenz | 705/31 |
| 2007/0055602 A1 * | 3/2007 | Mohn | 705/36 R |

OTHER PUBLICATIONS http://web.archive.org/web/20031205025057/www.irs.gov/formspubs/.*

* cited by examiner

Primary Examiner — Ryan Zeender
Assistant Examiner — Dana Amsdell
(74) Attorney, Agent, or Firm — Osha • Liang LLP (57) ABSTRACT Method and apparatus for an automated, client-specific notification service for reporting return preparers. A notification mechanism may be implemented as a part or component of a return preparation program or as a separate application. The notification mechanism may generate customized notifications for clients based at least in part on the clients' previous return information, for example information from previously filed tax returns. The notification mechanism may customize both the content of the notifications and the timing of the notifications based on each client's particular return information. The notifications generated by the notification mechanism may include or indicate any information related to the return preparation and filing process. The information in a particular notification may be tailored to the specific client's reporting situation. The notifications may be provided to the client(s) via one or more other communications channels or mechanisms.

18 Claims, 4 Drawing Sheets

METHOD AND APPARATUS FOR CLIENT-SPECIFIC NOTIFICATION SERVICE

BACKGROUND

Tax preparation software programs (hereinafter referred to as "tax programs") are available from various vendors that may be used to assist tax preparers in preparing Federal, State, municipal/local, or other tax returns for individual or corporate taxable entities (clients). These tax programs may be used by tax preparation professionals (tax preparers) to prepare various tax returns and other tax-related documents, such as tax estimates, for multiple clients. These tax programs may be used to prepare tax returns, tax estimates, or other tax-related documents for income, property, sales, payroll, or other types of taxes. Further, these tax programs may be used to prepare annual taxes, quarterly taxes, taxes based on a fiscal year, etc.

Conventionally, to communicate tax-related information to clients, tax preparers have relied on generic notification methods (e.g., newsletters) that provide the same tax-related information to all of the preparer's clients.

SUMMARY

Various embodiments of a method and apparatus for an automated, client-specific notification service for tax preparers are described. In embodiments, a notification mechanism may be implemented as a part or component of a tax preparation software program or alternatively as a separate application or utility, or may be integrated with other tax-related or non-tax related software. The notification mechanism may provide an automated notification service for tax preparers that provides customized notifications for clients of the tax preparers based on the clients' previous tax information. The notification mechanism may customize both the content of the notifications and the timing of the notifications based on each client's particular tax information.

In embodiments, the notification mechanism may access client tax information collected via a tax preparation software program to generate notifications that may be sent to particular clients or groups of clients of the tax preparer. The notifications may be tailored to and/or targeted at particular clients or groups of clients. The clients may include, but are not limited to, individual and/or corporate taxable entities. Generation of the notifications may be based at least in part on the clients' tax and other information collected via the tax program in preparing the clients' Federal, State, local, or other tax returns and other tax documents. This information may be collectively stored in a database, data store, or other searchable data collection, and may be updated as new information becomes available. In addition, embodiments may include a set of criteria or rules that may be applied by the notification mechanism in generating the notifications. These rules may be used, for example, in determining if and when a notification or notifications are to be sent to client(s), in determining one or more particular clients to receive notification(s), and in determining content of the notifications. Other information on taxes, tax laws, and the tax preparation and filing process, including but not limited to current tax laws and regulations, changes to tax laws, calendars of tax-related dates, tax-related content for inclusion in notifications, etc., may also be used by the notification mechanism in generating notifications for clients.

Client tax information in a client tax information database that may be used in generating custom notifications may include any information from the clients, such as information that may be present in a client tax return. Note that other client-related information may be included in a database such as a client tax information database. Exemplary client tax information that may be used in customizing notifications may include one or more of, but is not limited to: relevant date information and age information; types of taxes typically paid by that client; residency; whether the client itemizes deductions, the types of deductions, if the client has claimed IRA deductions, etc.; particular tax or other forms the client has filed: e.g., whether the client has filed a schedule C (i.e., is a business), if the client has reported rental income, farm income, partnership income; depreciation calculations; whether and what types of tax credits the client has reported; etc. In general, any tax-related and/or personal information may be used in customizing notifications.

The notifications generated by the notification mechanism may, for example, include or indicate one or more of, but not limited to, tax tips, hints, reminders, instructions, due dates, notices of changes in tax laws and/or in the clients' tax status, tax planning information, or in general any information related to the tax preparation and filing process. The information in a particular notification may be tailored to the specific client's tax needs and/or interests. The notifications may be provided to the client(s) in the form of emails, faxes, printed letters that are mailed to the clients, or via one or more other communications channels or mechanisms, or by a combination of two or more communications channels or mechanisms. In some instances, a notification may include a hyperlink or links (e.g., a URL to a web site included in an email notification) or other mechanisms or instructions that may direct the client to additional information related to the content of the notification.

In one embodiment, notifications may be generated in the form of a "newsletter" that is periodically or aperiodically generated for and sent to at least a subset of the preparer's clients. At least some of the content of the newsletter sent to each client may be customized by the notification mechanism according to that client's tax needs or interests based on that client's tax information in tax information database. Note that notifications may be customized for specific clients or groups of clients according to one or more other criteria or combinations of two or more criteria.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for an automated, client-specific notification service for tax preparers (also referred to herein as "preparers") are described. In embodiments, a notification mechanism may be implemented as a part or component of a tax preparation software program (referred to herein as a "tax program") or alternatively as a separate application or utility, or may be integrated with other tax-related or non-tax related software. The notification mechanism may provide an automated notification service for tax preparers that provides customized notifications for clients based on the clients' previous tax information (e.g., previous tax returns). The notification mechanism may customize both the content of the notifications and the timing of the notifications based on each client's particular tax information.

Figure 1:
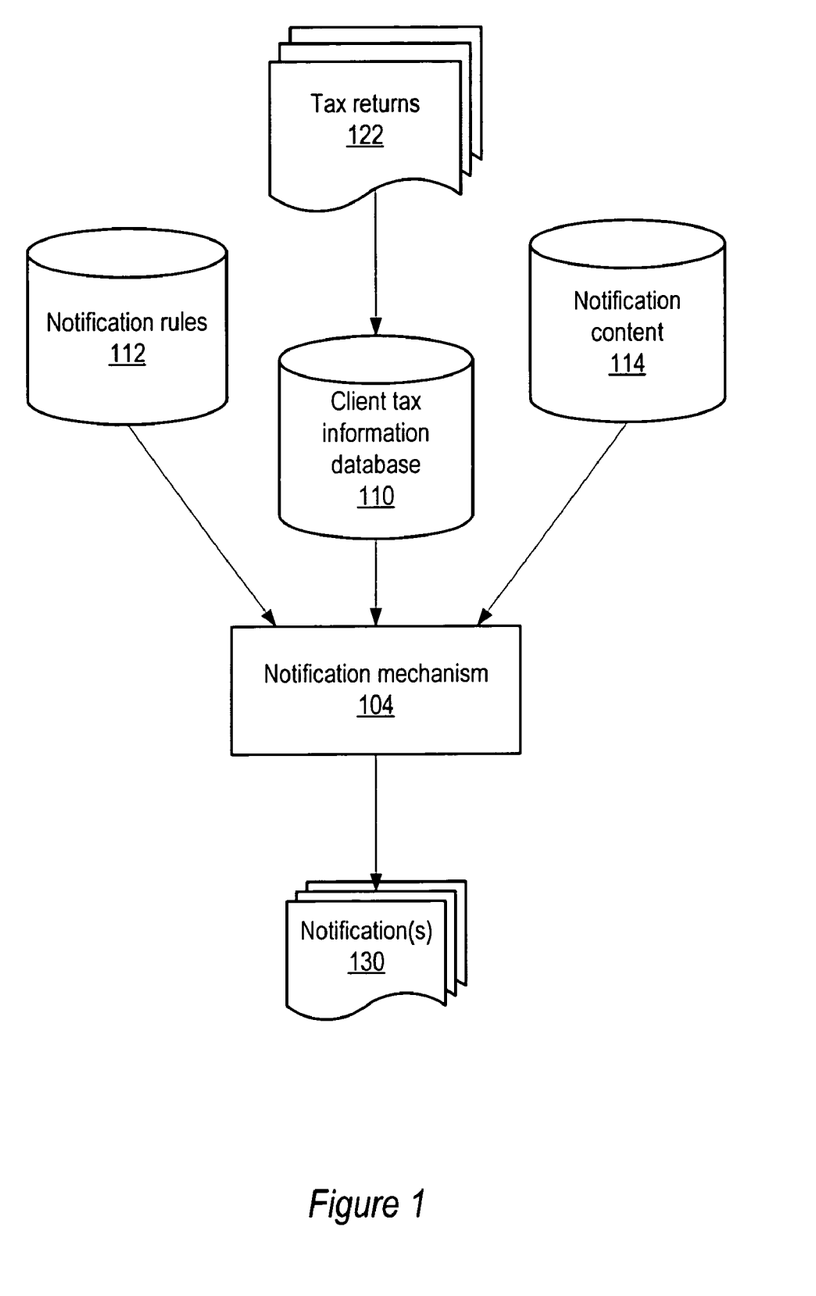
FIG. 1 illustrates a notification mechanism that may be used to implement a client-specific notification service according to one embodiment.

FIG. 1 illustrates a notification mechanism that may be used to implement a client-specific notification service according to one embodiment. The notification mechanism 104 may access client tax information 110 collected via the tax preparation software program to generate notifications 130 that may be sent to particular clients or groups of clients of the tax preparer. The notifications 130 may be tailored to and/or targeted at particular clients or groups of clients of the tax preparer. The clients may include individual and/or corporate taxable entities. The term "client", as used herein, is inclusive of any entity, individual or corporate, for which a tax preparer may prepare tax returns or other tax-related documents. Note that a tax preparer may prepare returns or other tax-related documents for one or more of, but not limited to, individual taxpayers, corporations, partnerships, S-Corporations, fiduciaries (trusts and estates), estate transfers, gift taxes, tax-exempt organizations, and benefit plans. Tax-related documents may include, but are not limited to, informational returns that are required for reporting purposes, but that do not result in or require the payment of any actual taxes. Further note that tax returns or other tax-related documents may be prepared for Federal, State, local, or other taxes.

Generation of the notifications 130 may be based at least in part on the clients' tax and other information 110 collected via the tax program in preparing the clients' Federal, State, and/or local tax returns and other tax documents. This information 110 may be collectively stored in a database, data store, or other searchable data collection (hereinafter simply referred to as a "database"), and may be updated as new information becomes available. In addition, embodiments may include a set of criteria or rules 112 that may be applied by the notification mechanism 104 in generating the notifications 130. These rules 112 may be used, for example, in determining if and when a notification or notifications are to be sent to client(s), in determining one or more particular clients to receive notification(s), and in determining content of the notifications. In one embodiment, the rules 112 may include standard or default rules that may be applied as desired in all instances of the notification mechanism and rules customized for the particular preparer and/or for particular clients of a preparer. Other information on taxes and the tax preparation process 114, including but not limited to current tax laws and regulations, changes to tax laws, calendars of tax-related dates, etc., may also be used by the notification mechanism 104 in generating notifications 130 for clients.

Client tax information in database 110 may include any information from clients, such as information that may be present in a client tax return, that may be used to customize notifications 130. Note that other client-related information may be included in client tax information database 110. Exemplary client tax information that may be used in customizing notifications 130 may include one or more of, but is not limited to: relevant date information and age information; types of taxes typically paid by that client; residency; whether the client itemizes deductions, the types of deductions, if the client has claimed IRA deductions, etc.; particular tax or other forms the client has filed: e.g., whether the client has filed a schedule C (i.e., is a business), if the client has reported rental income, farm income, partnership income; depreciation calculations; etc. In general, any tax-related and/or personal information may be used in customizing notifications 130.

An example of client tax information that may be used in customizing notifications 130 may be the type(s) of itemized deductions that the clients claim on previous tax returns. For example, some clients may claim medical expense deductions. If there is a change in tax laws that affect taxpayers that claim medical expense deductions, customized notifications 130 may be sent to clients in client tax information database 110 who have claimed medical expense deductions. Other examples of deductions that may also be used as criteria for notifications 130 may include, but are not limited to, charitable contributions, non-cash charitable contributions, and charitable mileage. Another example of client tax information that may be used in customizing notifications may be the type(s) of credits that the clients claim on previous tax returns. Examples of tax credits that may be used as criteria for notifications 130 may include, but are not limited to, child tax credits, adoption credits, and earned income credits. Another example of client tax information that may be used in customizing notifications may be adjusted gross income (AGI), which may be used as a criterion to determine which clients (taxpayers) are affected by various tax laws. For example, a new or modified tax law may change the tax rate for taxpayers with an AGI above $200,000. The notification mechanism 104 may locate clients in client tax information in database 110 with returns that indicate an AGI of over $200 k and send them notifications 130 including content describing the new or modified tax law and the changed tax rate, and possibly other content informing the client of other information or tips regarding the new or modified tax law. Clients not affected by the tax law (i.e., clients with an AGI below $200 k) are not sent the notifications. Similarly, capital gains may be used as a criterion. Notifications 130 may be generated and sent according to which clients have reported capital gains as indicated in client tax information database 110.

Note that client tax information in client tax information database 110 used to generate customized notifications 130 may be from Federal tax returns, State tax returns, and/or from local, municipal, city, or other tax authority returns. In general, client tax information used by notification mechanism 104 to customize notifications 130 may be from one or a combination of two or more tax returns for one or more tax authorities.

The notifications 130 generated by the notification mechanism 104 may, for example, include or indicate one or more of, but not limited to, tax tips, hints, reminders, instructions, due dates, notices of changes in tax laws and/or in the clients' tax status, tax planning information, or in general any information related to the tax preparation and filing process. The information in a particular notification 130 may be tailored to the specific client's tax needs and/or interests. The notifications 130 may be provided to the client(s) in the form of emails, faxes, printed letters that are mailed to the clients, or via one or more other communications channels or mechanisms, or by a combination of two or more communications channels or mechanisms. In some instances, a notification 130 may include a hyperlink or links (e.g., a URL to a web site included in an email notification) or other mechanisms or instructions that may direct the client to additional information related to the content of the notification 130. Examples of links that may be included in notifications 130 may include, but are not limited to: links to page(s) on the preparer's web site, links to web sites providing IRA or other financial information, links to bank sites, links to web sites of other financial institutions, links to the Federal IRS web site or to state or local tax-related web sites, links to a local tax program help application, links to help forums, etc. In one embodiment, a notification 130 may include a hyperlink to a client's personal web page, provided and maintained by the preparer, with a specific login, on which additional custom information for the client may be provided, including additional hyperlinks to other sites.

In one embodiment, notifications 130 may be generated by notification mechanism 104 in the form of a "newsletter" that is periodically or aperiodically generated for and sent to at least a subset of the preparer's clients. For example, notification mechanism 104 may generate weekly, monthly, and/or quarterly newsletter from the preparer to be sent to at least some of the preparer's clients. However, instead of sending the same content in each newsletter, at least some of the content of the newsletter sent to each client may be customized by notification mechanism 104 according to that client's tax needs or interests based on that client's tax information in tax information database 110. For example, newsletters (notifications 130) sent to corporate and individual entities may include different content based on the different tax needs and interests of corporate and individual entities. As another example, different clients may have different tax-related due dates, and the notification mechanism 104 may customize each newsletter to include due date information specific to the target client. As yet another example, different clients may reside in different areas and thus may be under different state or local tax authorities, and the newsletters may include content customized according to the tax authorities that are applicable to the individual clients. Note that notifications 130 may be customized for specific clients or groups of clients according to one or more other criteria or combinations of two or more criteria.

In various embodiments, the notification mechanism 104 may be executed periodically or aperiodically (e.g., daily, weekly, etc.) to generate notifications 130 for one or more clients of the preparer, and/or the notification mechanism 104 may be triggered to generate notifications by an event, such as a change in tax laws, to generate notifications 130 related to the event for at least a subset of the clients of the preparer who may be affected by the event. In some cases, a preparer may manually initiate the notification mechanism 104 to generate notifications for one or more of the preparer's clients, for example according to one or more criteria specified by the preparer. Notifications 130 may be targeted at individual clients and/or at groups of clients according to one or more criteria.

In one embodiment, the notification mechanism 104 may automatically send notifications 130 to clients when the notifications 130 are generated. In one embodiment, the notification mechanism 104 may instead notify the preparer that there are notifications 130 for one or more clients. The preparer may then, if desired, review and possibly modify the notifications 130, and may elect to send or not send the notifications 130 to the clients. Thus, the preparer may control the actual sending of the notifications 130, and also may review and edit the content of the notifications if desired. In one embodiment, the preparer may be given the option to either have generated notifications 130 automatically sent to clients or to review and selectively send the notifications 130.

Notifications 130 may be generated for any client, individual or corporate, for which a tax preparer may prepare tax returns or other tax-related documents. When sending a notification 130 to an individual, the notification 130 may be sent to the individual (e.g., to an email address, street address, or P.O. Box) or alternatively to another entity that is an authorized representative of the individual (e.g., to a person holding power of attorney for the individual). When sending a notification 130 to a corporate client, the notification 130 may be sent to the corporate client (e.g., to an email address, street address, or P.O. Box) or to one or more entities that are authorized representatives, officers, or employees of the corporate client. For example, if the corporate client is a business, the notification 130 may be sent to a financial officer, the owner, and/or the manager of the business.

Embodiments of the computer-implemented notification mechanism 104 may thus provide an automated notification service for tax preparers that may be used to provide notifications 130 related to tax issues and tax return preparation that are specific to their clients' individual or group tax situations and needs based at least in part on data 110 collected from the tax program via which the clients' tax returns are prepared. The notification mechanism 104 may, for example, be used to provide on-going tax planning information specific to the clients, provide reminders to the clients regarding tax due dates or other significant dates or other tax-related issues, and provide an on-going "personal" touch between the tax preparer and the clients as the information being provided to the clients is specifically tailored to the clients' individual or business needs.

In one embodiment, the notification mechanism 104 may be integrated as a feature or component of a tax program. In this embodiment, the notification mechanism 104 may extrapolate client-specific data from within the tax program pertaining to pertinent dates, such as dates that estimated tax payments are due, and integrate the extrapolated client-specific data with information from a collection or database of tax-related information (notification content 114) which may be pertinent to a tax period for (e.g., month/quarter/year) and/or tax situation of a client or client's business. Notification content 114 may include one or more of, but is not limited to, information related to tax requirements, tips, reminders, planning information, hints, calendars indicating tax-related dates, hyperlinks, etc. In one embodiment, notification content 114 may be updated with current tax-related information and verified for accuracy, for example by a tax analyst. The notification mechanism 104 may, for example, provide the tax preparer with an option to print a client letter to mail with this tax information to the client and/or to send an e-mail to the client that includes the tax information. In one embodiment, the e-mail may be generated in HTML format and may include hyperlinks that may allow the client to access additional information on topic(s) in which the client is interested.

In another embodiment, the notification mechanism 104 may be implemented as a separate application or utility that may be integrated with one or more tax and accounting products from which the tax preparer can elect to import client-specific tax data. The notification application may provide the tax preparer with the ability to integrate the imported data with a selection of tax information from notification content 114 (e.g., tax requirements, tips, hints, etc.) which may be pertinent to the tax period for (e.g., month/quarter/year) and/or tax situation of the client or client's business. In one embodiment, the notification content 114 may be updated with current tax-related information and verified for accuracy, for example by a tax analyst. After integrating the data, the notification application may, for example, provide the tax preparer with an option to print a client letter to mail with this tax information to the client and/or to send an e-mail to the client that includes the tax information. In one embodiment, the e-mail may be generated in HTML format and may include hyperlinks that may allow the client to access additional information on topic(s) in which the client is interested.

Note that tax returns may be part of a broader class of financial returns. Financial returns may be defined as sets of one or more documents that may be prepared according to the requirements or at the request of some governmental entity for a specified reporting period. Further, note that financial returns may be tax or tax-related returns, or informational returns that are required for reporting purposes, but that do not result in or require the payment of any actual taxes. Examples of informational returns may include, but are not limited to, partnership returns and benefit plan returns. Thus, tax programs may be classified as a type of, or function or module of, financial return preparation programs. Therefore, it is important to note that "tax program" is used herein as an example of the broader class of financial return preparation programs, and "tax return" is used herein as an example of the broader class of financial returns. Thus, the method and apparatus as described herein may be more generally applied to providing a notification service for financial return preparation programs, with tax programs and tax return preparation given as an example of a specific application of the method and apparatus.

In addition, tax returns and financial returns, including informational returns, may be considered as part of a general class of reporting returns. Reporting returns may be defined as sets of one or more documents that may be prepared for a reporting entity (which may be an individual or any sort of corporate or other entity) according to the requirements or at the request of a monitoring entity, for example a governmental (Federal, State, local, or other) entity, typically but not necessarily for specified reporting periods. The reporting returns may be informational or financial returns related to any concern, endeavor, activity, etc. of the reporting entity that is monitored according to the requirements or at the request of the monitoring entity. In addition to tax returns, examples of the general class of reporting returns, reporting entities, and monitoring entities may include required filings with the Securities and Exchange Commission (SEC), required filings by industries (such as for the quantity of particular pollutants released in a given period) with environmental agencies such as the Environmental Protection Agency (EPA), various required periodic reports by public schools to the appropriate Federal, State, or local education-related monitoring entity, and so on.

Thus, financial return preparation programs, including tax programs, may be classified as a type of, or function or module of, a general class of reporting return preparation programs. Therefore, it is important to note that "tax program" is used herein as an example of a general class of reporting return preparation programs, and "tax return" is used herein as an example of the general class of reporting returns. Thus, the method and apparatus as described herein may be generally applied to providing a notification service for reporting return preparation programs, with tax programs and tax return preparation given as an example of a specific application of the method and apparatus.

Further note that "tax preparer" or "preparer", as used herein, may be generally applied to an entity that prepares reporting returns on behalf of a reporting entity to be filed with a monitoring entity.

Figure 2:
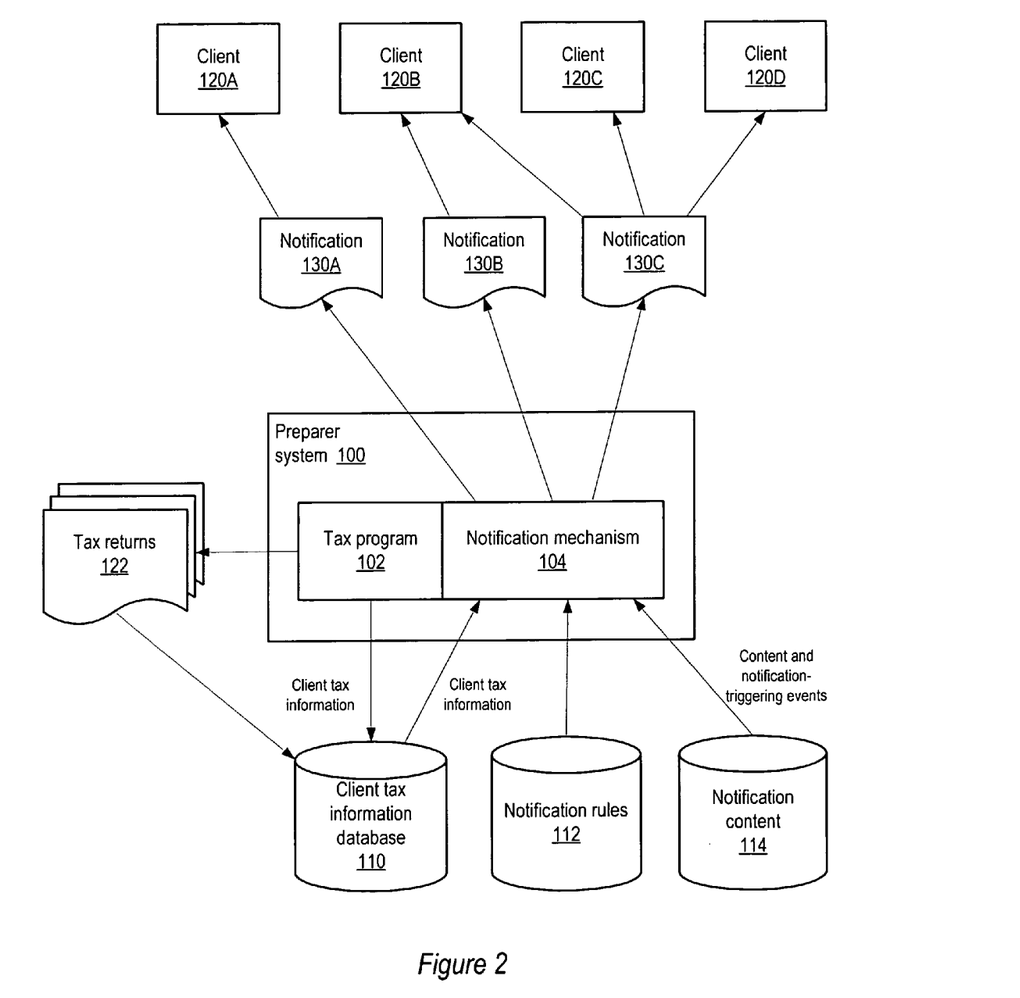
FIG. 2 illustrates data flow for a notification service in an exemplary tax preparation system according to one embodiment.

FIG. 2 illustrates data flow for a notification service in an exemplary tax preparation system according to one embodiment. A preparer system 100 may include an instance of a tax program 102 and a notification mechanism 104. As described above, notification mechanism 104 may be integrated with tax program 102, or alternatively may be implemented as a stand-alone application or utility. Note that, while FIG. 2 illustrates both tax program 102 and notification mechanism 104 as implemented on one computer system, in embodiments where the notification mechanism 104 is implemented as a stand-alone utility or application, the two programs may reside on different computer systems.

Tax program 102 may be used by a tax preparer to prepare tax returns 122 for two or more clients 120 from personal, business, income, expense, property, gain, loss, charitable contribution, and other tax-related information collected from the clients 120. Note that clients 120 are inclusive of any taxable entity and, in addition, entities for which financial information or returns may be required even if the entity is not required to pay taxes. Further, clients 120 may include individuals and/or corporate entities. Client tax-related information, including information from previous tax returns 122, may be organized and stored in a client tax information database 110. Client tax information database 110 may be implemented in accordance with any of a variety of data collection techniques or mechanisms and may reside on any of a variety of locally or remotely connected data storage devices.

Notification mechanism 104 may periodically or aperiodically execute to generate notifications 130 for clients 120. Execution of the notification mechanism 104 may be performed according to a schedule (e.g., daily, weekly, monthly, quarterly, etc.), may be triggered by an event (e.g., a change in a tax law that generates an update of notification content 114), and/or may be manually initiated by the preparer if desired. In one embodiment, notification mechanism 104 may run continuously as a background process to generate notifications 130.

In one embodiment, a notification service may include at least notification mechanism 104, client tax information database 110, notification rules 112, and notification content 114. Client tax information database 110 may include client tax-related information, including but not limited to personal and tax-related information from current or previous tax returns prepared for clients 120, which may be collected and stored in client tax information database 110 by tax program 102. Notification rules 112 may include a set of criteria or rules that may be applied by the notification mechanism 104 in generating notifications 130. These rules may be used, for example, in determining if and when notifications 130 are to be sent to clients 120, in determining one or more particular clients 120 to receive notifications 130, and in determining content of the notifications 130. In one embodiment, notification rules 112 may include standard or default rules that may be applied as desired in all instances of the notification mechanism 104. In one embodiment, notification rules 112 may include rules customized for the particular preparer and/or for particular clients 130 of a preparer. Notification content 114 may include any tax-related information, such as information on current tax laws and regulations for one or more governmental or regulatory entities, changes to tax laws, calendars of tax-related dates, etc., that may be used by the notification mechanism 104 in generating notifications 130 for clients 120. Note that notification content 114 may include information and/or data that may be included in notifications 130, and also may include information and/or data that may be used in triggering the generation of notifications 130 and in selecting clients 120 to receive notifications 130.

In one embodiment, to generate notifications 130, notification mechanism 104 may access client tax information database 110, notification rules 112, and notification content 114. Notification mechanism 104 may access notification rules 112 to determine one or more search criteria to be applied to client tax information in database 110 to determine one or more clients 120 to receive notifications 130. For example, client tax information 110 may include birthdates of clients and dependents of clients. A particular rule in notifications rules 112 may be of the general form:

Search client tax information database 110 for all clients with dependents who will turn 18 within the next N months and send a notification to any located clients informing them that the dependents will not be classified as dependents beginning in tax year Y As another example, a particular rule in notifications rules 112 may be of the general form:

Search client tax information database 110 for all clients who will turn 65 within the next N months and send a notification to any located clients that includes information of interest to those 65 or older Content in a notification 130 sent according to the above rule, as well as content in notifications sent according to other rules, is not limited to strictly tax-related information. For example, a notification sent to clients 120 that are going to turn 65 in the next N months may include information related to how turning 65 is going to change taxes, information on how social security benefits are going to be affected and how the clients need to prepare for that, reminders to sign up for Medicare or other programs, and so on. Thus note that notification content 114 may include information that is not strictly tax-related, and may include additional information that is generally related to financial issues that may be of interest to clients 120 and that may be included in notifications 130 to clients 120.

Further note that the above rule and other rules may be further specified according to one or more additional criteria, including but not limited to the marital status, gender, tax bracket, income sources, and residency of the clients. Thus, customized notifications 130 may be sent to individual clients according to one or more criteria in client tax information database 110.

As yet another example, client tax information 110 may include information on various corporate client's fiscal year policies. A particular corporation may base its calendar on a fiscal year rather than on a calendar year. A particular rule in notifications rules 112 may be of the general form:

Search client tax information database 110 for all corporate clients that employ a fiscal year and send a notification to any located corporate clients informing them of tax estimate due dates based on the client's particular fiscal year As still yet another example, client tax information 110 may include information on which clients 120 itemize deductions. A particular rule in notifications rules 112 may be of the general form:

Search client tax information database 110 for all clients that itemize deductions and send a notification to any located clients that includes information related to itemizing deductions Also note that two or more criteria may be applied when searching client tax information 110 for clients 120 to receive custom notifications 120. For example, a particular rule in notifications rules 112 may be of the general form:

Search client tax information database 110 for all clients that reside in State S and that have reported an income between $D_1$ and $D_2$ dollars in the last five years and send a notification to any located clients that includes information related to tax laws in State S for residents in their income bracket Notification mechanism 104 may access notification content 114 to retrieve specific content for notifications 130 (e.g. tax tips, hints, changes in tax laws, due dates, etc.). Note that notification content 114 may also be used by notification mechanism 104 in determining clients 120 to receive notifications and/or to determine timing of notifications. In this aspect, notification content 114 may include data (e.g., dates and tax laws) that may generate or trigger notifications to at least some clients 120. For example, a particular rule in notification rules 112 may be of the general form:

If tax law A in notification content 114 is changed, then search client tax information database 110 for all clients affected by tax law A and send them a notification of the change in tax law A As another example, a particular rule in notification rules 112 may be of the general form:

If a tax due date (or tax estimate due date) for a tax authority B in notification content 114 is one month or less away, then search client tax information database 110 for all clients affected by the due date and send them a reminder of the due date Note that one or more search criteria in client tax information database 110 may be specified in a rule triggered by information or data in notification content 114, or by a modification to notification content 114. For example, a particular rule in notification rules 112 may be of the general form:

If tax law B in notification content 114 is changed, then search client tax information database 110 for all clients of at least age X that have filed taxes under the tax authority and send them a notification of the change in tax law B As another example, a new tax law may come into effect that is retroactive, and thus may potentially affect the tax returns of some clients 120 that have already been filed. The affected returns may need to be amended to reflect changes brought about by the new tax law. The preparer may thus need to identify which clients 120 are affected by the new tax law and to notify the clients that their returns may need to be amended to conform to the new tax law. To notify the affected clients 120, a particular rule may be added by the preparer to notification rules 112 that may be of the general form:

Search client tax information database 110 for all clients that have filed tax returns affected by new law X and send any located clients a notification including content from notification content 114 indicating that their filed returns may need to be amended to meet the requirements of the new tax law Note that the preparer may add or modify information or data in notification content 114 that is to be included in or otherwise used in the generation of notifications 130.

One or more rules in notification rules 112 may be tailored to specific clients 120. For example, a particular rule in notification rules 112 may be of the general form:

Send corporate client C a quarterly notification that its tax estimate for the quarter is due one week before the client's fiscal quarter ends Client tax information database 110, as previously noted, includes at least information from previous tax returns of clients 120. In one embodiment, client tax information database 110 may be modified or customized by the preparer. Note that notification rules 112 and/or notification content 114 may also be modified to utilize the modifications in client tax information database 110. For example, in one embodiment, the default "out of the box" notification service may be tailored to national, or national and state, tax authorities. However, client tax information database 110, notification rules 112, and notification content 114 may be customized by the preparer to provide notifications 130 related to local (e.g., municipal) tax laws, if desired. As another example, in one embodiment, areas of interest of the clients 120 as specified by the preparer and/or the clients themselves may be added to the client tax information database 110. For example, the preparer may provide a list of topics or areas of interest to new or existing clients 120 to allow the clients 120, or simply ask the clients 120 during interviews. The clients 120 may specify to the preparer which tax-related topics the clients 120 are interested in receiving information on. For example, a client may be interested in information pertaining to tax planning, 529 plans for children, and/or setting up trust funds. The clients' specifications may then be added to the client tax information database 110. Information pertaining to the topics may be included in notification content 114. Rules to generate notifications based on the topics may be added to notification rules 112. For example, a particular rule in notification rules 112 may be of the general form:

Send content C from notification content 114 related to topic T to all clients 120 that indicate they are interested in topic T in client tax information database 110

Note that a rule such as the above may be executed when preparing periodic or aperiodic notifications (e.g., newsletters), and/or may be triggered by an event such as modification of information and/or data in notification content 114. For example, a particular rule in notification rules 112 may be of the general form:

If content C related to topic T in notification content 114 is updated, send updated content C to all clients 120 that indicate they are interested in topic T in client tax information database 110

Thus, preparers may request of their clients 120 what particular topics the clients 120 may be interested in receiving information on, and may enter this information into the notification service so that the notification service may automatically tailor content of notifications 130 towards the individual clients' interests.

The above exemplary rules and other rules may trigger a special notification 130 to be sent to affected clients 120 and/or may trigger an inclusion of custom content in a newsletter-type notification 130 for affected clients 120. Also note that, if one client 120 is determined to qualify for notification under two or more rules, one actual notification 130 (e.g., one e-mail message or one printed or faxed document) may be generated and sent to the client 120 that includes notification information for the two or more rules under which the client 120 qualifies.

Note that the above exemplary rules are stated in a generic format that is not intended to be limiting. One of ordinary skill in the art will recognize that such rules may be implemented in a computer program in any of a variety of formats.

There may be cases or situations where the preparer has information about particular clients 120 that may not be included in the client tax information database 110. For example, the preparer may be aware that a client 120 is getting married, is expecting a child, is adopting a child, that a spouse has deceased, that the client 120 is getting divorced, etc. To handle such instances, and possibly for other purposes, in one embodiment, the notification mechanism 104 may provide a mechanism whereby the preparer may trigger a specific notification 130 that includes content relevant to a particular situation of a particular client 120. For example, the preparer may manually trigger a notification 130 to a particular client 120 that the preparer knows is adopting a child that includes content and/or hyperlinks relevant to tax issues when adopting a child.

Figure 3:
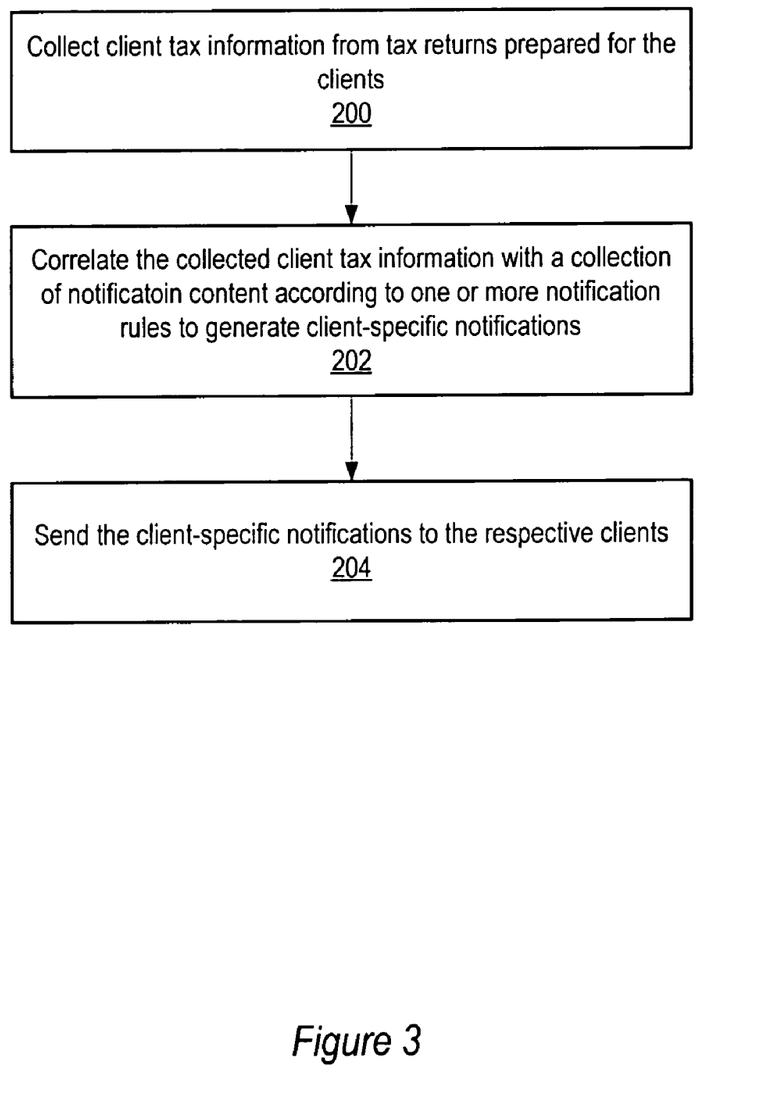
FIG. 3 is a flowchart of a computer-implemented method for providing a notification service for automatically generating customized notifications for clients of tax preparers according to one embodiment.

FIG. 3 is a flowchart of a computer-implemented method for providing a notification service for automatically generating customized notifications for clients of tax preparers according to one embodiment. As indicated at 200, client tax information from tax returns prepared for the clients, for example using a tax preparation software program, may be collected into a client tax information database. In one embodiment, client information from other sources may be added to the client tax information database. In one embodiment, a notification mechanism as previously described herein may collect and organize the client tax information into the client tax information database. In other embodiments, the client tax information may be collected into the client tax information database by some other process or mechanism, for example by a tax preparation program as the tax returns for the clients are prepared.

As indicated at 202, the collected client tax information may be correlated with a collection of notification content according to one or more notification rules to generate client-specific notifications. The collection of notification content may include one or more of, but is not limited to, information related to tax requirements, tips, reminders, planning information, hints, calendars indicating tax-related dates, hyperlinks, etc. Each notification rule, as previously described, may specify one or more criteria for selecting clients from client tax information database. These criteria for each rule may be used to search client tax information database to locate or select one or more clients that satisfy the criteria as specified by the notification rule. Each notification rule may also include one or more specifications for content to be included in the notifications to be generated for the selected clients. Examples of rules, including exemplary search criteria for clients in client tax information database and examples of notification content that may be included in notifications, have been previously described.

As indicated at 204, the client-specific notifications may then be sent to the respective clients. Note that the client-specific notifications may be sent to the targeted clients via one or more of a variety of communications methods or channels, including, but not limited to, e-mail, fax, and standard postal mail. Further note that client-specific notifications may include hyperlinks for accessing additional information, or alternatively information, such as phone numbers or addresses, for obtaining additional information.

Exemplary System

Figure 4:
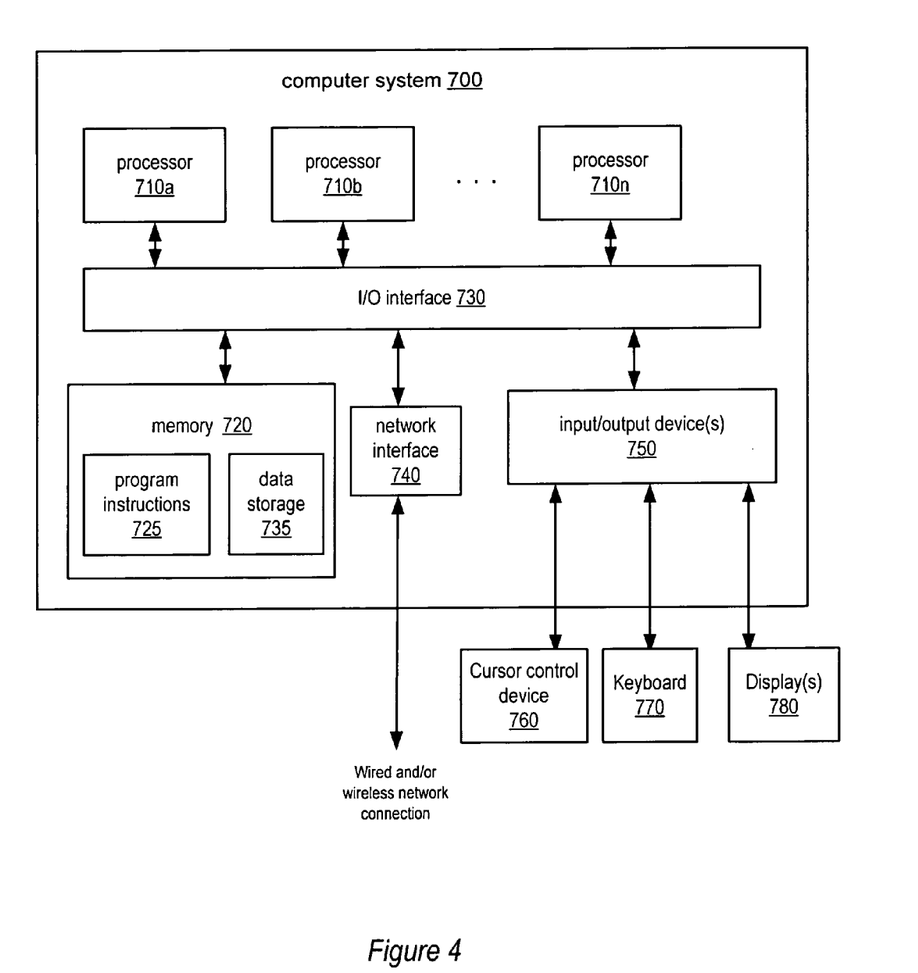
FIG. 4 illustrates an exemplary computer system on which embodiments may be implemented.

Various embodiments of a notification mechanism as described herein may be executed on one or more computer systems, which may interact with various other devices. One such computer system is illustrated by FIG. 4. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as the program instructions (notification mechanism 104 of FIGS. 1 and 2) and data (client tax information database 110, notification rules 112, and notification content 114 of FIGS. 1 and 2) described above in respect to embodiments of a notification service, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 4, memory 720 may include program instructions 725, configured to implement at least a portion of embodiments of the notification service as described herein, and data storage 735, comprising various documents, tables, databases, etc. accessible by program instructions 725. In one embodiment, program instructions 725 may include software elements illustrated in the Figures (e.g., notification mechanism 104 and tax program 102 in FIGS. 1 and 2) and data storage 736 may include data illustrated in the Figures (e.g., client tax information database 110, notification rules 112, and current tax information 114 of FIGS. 1 and 2). In other embodiments, different software elements and data may be included.

Those skilled in the art will appreciate that computer system 700 is merely illustrative and is not intended to limit the scope of the shopping assistance mechanism as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
generating based on an event characterized by a plurality of changes in tax law, a personalized newsletter for each of a plurality of clients by, for each change of the plurality of changes:
identifying a subject matter of the change in the tax law;
selecting with a notification mechanism, a notification rule based on the subject matter,
wherein the notification rule specifies at least one tax criterion of a plurality of tax criteria to be applied to client reporting information, and
wherein the at least one tax criterion comprises at least one selected from a group consisting of itemized deductions, type of deductions, schedule C status, rental income, charitable contribution, and child tax credits;
searching by a computer, the client reporting information according to the notification rule, wherein the client reporting information comprises previously filed reporting returns each associated with one of the plurality of clients, and wherein the previously filed reporting returns comprise the plurality of tax criterion ( );
generating by computer, a client group by selecting a subset of the plurality of clients having the previously filed reporting returns matching the at least one tax criterion;
selecting by a computer, from a collection of notification content within a computer database, content relevant to the one of the plurality of changes affecting the at least one tax criterion; and
populating with a notification by a computer, the personalized newsletter corresponding to each of the plurality of clients in the client group, wherein the notification comprises the selected content;
sending the personalized newsletter to each of the plurality of clients,
wherein the notification rule corresponding to a first change of the plurality of changes specifies at least two tax criteria of the plurality of tax criteria,
wherein the personalized newsletter for a first client of the plurality of clients comprises the notification of the first change and the notification of a second change of the plurality of changes, wherein the previously filed reporting returns of the first client includes the at least two tax criteria, and
wherein the personalized newsletter for a second client of the plurality of clients excludes the notification of the first change and comprises the notification of the second change, wherein the previously filed reporting returns of the second client excludes at least one of the at least two tax criteria.

2. The method as recited in claim 1, wherein the notification rule further specifies the selected content.

3. The method as recited in claim 1, wherein said client reporting information is collected from tax returns prepared for the plurality of clients using a tax preparation software program.

4. The method as recited in claim 1, wherein said client reporting information comprises one or more of Federal, State, and local tax return information for each of the plurality of clients.

5. The method as recited in claim 1, wherein said personalized newsletter is sent via an e-mail messages.

6. The method as recited in claim 1, wherein said personalized newsletter comprises a printed document for mailing.

7. The method as recited in claim 1, wherein said sending the personalized newsletter comprises one or more of emailing, mailing, and faxing the personalized newsletter to the respective identified client.

8. The method as recited in claim 1, wherein said notification comprises hyperlinks for accessing additional information relevant to the selected content.

9. The method as recited in claim 1, wherein the at least two clients are corporate clients.

10. The method as recited in claim 1, wherein the at least two clients are individuals.

11. The method as recited in claim 1, wherein said selected content associated with a third change of the plurality of changes comprises one selected from a group consisting of a reminder of a due date for a tax return and a tax estimate for the client.

12. The method as recited in claim 1, wherein said selected content corresponding to a third change of the plurality of changes comprises information related to a change in tax status, due to the third change in tax law, that affects the client.

13. A system, comprising:
one or more processors; and
a memory coupled to the one or more processors, wherein the memory comprises program instructions executable by the one or more processors to:
generate, based on an event characterized by a plurality of changes in tax law, a personalized newsletter for each of a plurality of clients by, for each change of the plurality of changes:
identifying a subject matter of the change in the tax law;
selecting a notification rule based on the subject matter,
wherein the notification rule specifies at least one tax criterion of a plurality of tax criteria to be applied to client reporting information, and wherein the at least one tax criterion comprises at least one selected from a group consisting of itemized deductions, type of deductions, schedule C status, rental income, charitable contribution, and child tax credits;

searching the client reporting information according to the notification rule, wherein the client reporting information comprises previously filed reporting returns each associated with one of the plurality of clients, wherein the previously filed reporting returns comprise the plurality of tax criterion;

generating a client group by selecting a subset of the plurality of clients having the previously filed reporting returns matching the at least one tax criterion;

selecting, from a collection of notification content, content relevant to the one of the plurality of changes affecting the at least one common tax criterion; and populating, with a notification, the personalized newsletter corresponding to each of the plurality of clients in the client group, wherein the notification comprises the selected content; and send the personalized newsletter to each of the plurality of clients, wherein the notification rule corresponding to a first change of the plurality of changes specifies at least two tax criteria of the plurality of tax criteria, wherein the personalized newsletter for a first client of the plurality of clients comprises the notification of the first change and the notification of a second change of the plurality of changes, wherein the previously filed reporting returns of the first client includes the at least two tax criteria, and wherein the personalized newsletter for a second client of the plurality of clients excludes the notification of the first change and comprises the notification of the second change, wherein the previously filed reporting returns of the second client excludes at least one of the at least two tax criteria.

14. The system as recited in claim 13, wherein the notification rule further specifies the selected content.

15. The system as recited in claim 13, wherein the personalized newsletter comprises hyperlinks for accessing additional information relevant to the selected content of the notifications.

16. A tangible, non-transitory computer readable storage medium comprising program instructions, wherein the program instructions are computer-executable to implement:

generating, based on an event characterized by a plurality of changes in tax law, a personalized newsletter for each of a plurality of clients by, for each change of the plurality of changes:

identifying a subject matter of the change in the tax law;

selecting a notification rule based on the subject matter, wherein the notification rule specifies at least one tax criterion of a plurality of tax criteria to be applied to client reporting information, and wherein the at least one tax criterion comprises at least one selected from a group consisting of itemized deductions, type of deductions, schedule C status, rental income, charitable contribution, and child tax credits;

searching the client reporting information according to the notification rule, wherein the client reporting information comprises previously filed reporting returns each associated with one of the plurality of clients, and wherein the previously filed reporting returns comprise the plurality of tax criterion;

generating a client group by selecting a subset of the plurality of clients having the previously filed reporting returns matching the at least one tax criterion;

selecting, from a collection of notification content, content relevant to the one of the plurality of changes affecting the at least one tax criterion; and populating, with a notification, the personalized newsletter corresponding to each of the plurality of clients in the client group, wherein the notification comprises the selected content; and sending the personalized newsletter to each of the plurality of clients, wherein the notification rule corresponding to a first change of the plurality of changes specifies at least two tax criteria of the plurality of tax criteria, wherein the personalized newsletter for a first client of the plurality of clients comprises the notification of the first change and the notification of a second change of the plurality of changes, wherein the previously filed reporting returns of the first client includes the at least two tax criteria, and wherein the personalized newsletter for a second client of the plurality of clients excludes the notification of the first change and comprises the notification of the second change, wherein the previously filed reporting returns of the second client excludes at least one of the at least two tax criteria.

17. The computer readable storage medium as recited in claim 16, wherein the notification rule further specifies the selected content.

18. The computer readable storage medium as recited in claim 16, wherein the personalized newsletter comprises hyperlinks for accessing additional information relevant to the selected content of the notifications.

* * * * *